United States Patent [19]

Williams et al.

[11] 4,292,330

[45] Sep. 29, 1981

[54] BREAD LEAVENING YEAST

[75] Inventors: Wilmore Williams, Wheaton; Anthony J. Luksas, Chicago, both of Ill.

[73] Assignee: Beatrice Foods Co., Chicago, Ill.

[21] Appl. No.: 58,619

[22] Filed: Jul. 18, 1979

[51] Int. Cl.³ .............................................. A21D 2/00
[52] U.S. Cl. ....................................... 426/20; 426/62; 426/549; 426/556
[58] Field of Search ....................... 426/18, 19, 20, 27, 426/549, 556, 558, 653, 60, 62

[56] References Cited

U.S. PATENT DOCUMENTS

| 3,438,786 | 4/1969 | Wutzel | 426/19 X |
| 3,466,174 | 9/1969 | Bundus et al. | 426/41 |
| 3,466,176 | 9/1969 | Bundus et al. | 426/41 |
| 3,466,177 | 9/1969 | Bundus et al. | 426/41 |
| 3,490,916 | 1/1970 | Henika | 426/19 |
| 3,720,519 | 3/1973 | Hamilton et al. | 426/583 |
| 3,737,327 | 6/1973 | Mayer et al. | 426/19 X |

Primary Examiner—Esther M. Kepplinger
Attorney, Agent, or Firm—Murray and Whisenhunt

[57] ABSTRACT

Dough compositions which are leavened and flavored by certain yeasts are provided, along with a process for production thereof. The particular yeasts are *Candida lusitaniae* and *Saccharomyces delbrueckii*. The yeasts do not effectively use sucrose as the primary energy source and the compositions will contain another sugar, e.g. dextrose.

16 Claims, No Drawings

BREAD LEAVENING YEAST

The present application relates to a yeast leavened dough composition, e.g. in breads, cakes, etc., and to processes for the production thereof.

BACKGROUND OF THE INVENTION

Conventional yeast leavened doughs contain yeast, cereal flour, shortening, liquids, e.g. milk and water, and yeast food, along with optional ingredients such as salt, sugar, malt, milk solids and softeners, such as mono- and diglycerides. The yeast is grown by fermentation and the fermentation functions to provide the desired leavening, flavor and aroma. Unfortunately, these desired functions of the yeast fermentation do not occur at the same rate. For example, leavening is achieved by the carbon dioxide generated during fermentation and adequate leavening can be achieved in relatively short fermentation times. On the other hand, adequate flavor and aroma development are much slower. Thus, the total fermentation time to leaven the dough and develop the required flavor and aroma can be quite extended. After fermentation, the dough is "panned" and allowed to further leaven or "proof" to the desired loaf volume. The total of the fermentation and proofing times result in relatively long bread production times. In the "straight" dough method, all of the ingredients are mixed as a batch and fermentation is continued for about 3 hours. In the "sponge dough" method, a fermented "sponge" from a previous fermented batch is mixed with the dough ingredients, which are then fermented. A small portion from that fermented batch is returned as the sponge for another batch. However, even in this method, fermentation times of 2 hours or more are often required, and proofing times are 1 hour or more.

Even with these extended fermentation periods, a compromise is practiced in reaching a minimum level of flavor and aroma with the desired level of leavening. The flavor and aroma development during this period is quite minimal and those conventional processes are routinely criticized in that they produce "tasteless" baked products. This problem is even further accentuated with the more rapid processes, e.g. the continuous and semicontinuous processes. Thus, the extended fermentation periods for producing even minimum levels of flavor and aroma have caused difficulties in all of the processes for providing yeast leavened baked goods, and especially for the more rapid processes.

As a result, the art has tended to accept that the more rapid processes for manufactured baked goods will produce little flavor and the art has concentrated efforts on even more rapid leavening, even at the expense of yet further decreased flavor and aroma. To mitigate the decreasing amount of flavor and aroma, the art has proposed to add flavor agents to the dough. Notably among such compositions are those disclosed in U.S. Pat. Nos. 3,466,176; 3,466,177; 3,466,174; and 3,485,641. These flavoring compositions provide increased amounts of flavor and are based on fermenting yeast in whey, which may be deproteinized, and which also may contain lactic acid. A wide variety of yeasts and bacteria have been proposed for producing such flavor compositions, e.g. *Saccharomyces cerevisiae* (normal baker's yeast), *Streptococcus lactis*, *Lactobacillus bulgaricus*, *Lactobacillus delbrueckii*, and *Streptococcus cremoris*, among others. While such added flavor compositions certainly improved these baked products, the flavor level is still quite low and is not comparable to full-flavored breads.

Further, the cost of such flavor compositions substantially increases ingredient costs of the dough and to that extent decreases the cost savings achieved by the rapid processes. Additionally, these flavor compositions do not produce the entire profile of the fully-developed yeast leavened breads in terms of flavor and aroma.

Accordingly, it would be of substantial benefit to the art to provide means of achieving adequately flavored breads in either shortened fermentation times, or full-flavored breads in conventional fermentation times.

SUMMARY OF THE INVENTION

It has been discovered that certain yeasts can be used to produce a fermented dough which will provide higher levels of flavor and aroma in shortened fermentation times, or provide increased levels of flavor and aroma in usual fermentation times. These yeasts are *Saccharomyces delbrueckii* and *Candida lusitaniae*.

As a subsidiary, but important discovery, the yeast of the present invention, as opposed to normal baker's yeast (*Saccharomyces cerevisiae*), cannot efficiently use the usual sucrose as a yeast growth source. Thus, the dough compositions must contain a yeast growth source other than sucrose. In this regard, dextrose has been found to be a most effective growth source.

The invention, therefore, provides an improved process. Thus, in a process for producing a leavened dough comprising forming a dough of a cereal flour, shortening, leavened yeast and a yeast growth source, fermenting the dough and leavening the dough, the present improvement is wherein the leavening yeasts are at least in part rapid flavor-producing yeasts selected from the group consisting of *Candida lusitaniae*, *Saccharomyces delbrueckii* and mixtures thereof.

Correspondingly, the present invention provides a fermented dough composition comprising a cereal, shortening, a yeast growth source, and at least in part rapid flavor producing yeasts selected from the group consisting of *Candida lusitaniae*, *Saccharomyces delbrueckii* and mixtures thereof.

DETAILED DESCRIPTION OF THE INVENTION

The dough with which the present yeasts are used is a conventional dough, and the ingredients thereof, along with the proportions thereof, are well known to the art and will not be described herein for the sake of conciseness. Basically, however, the dough comprises a cereal, normally in the form of a flour or meal, and the cereal can be chosen from any of the conventional cereals, e.g. wheat, oats, rice, barley, corn and rye. Similarly, the shortening is any of the conventional shortenings, e.g. animal and vegetable oils and fats, e.g. soy bean oil, corn oil, safflower oil, peanut oil and the hydrogenated and partially hydrogenated forms thereof. The dough may also include any of the usual conventional ingredients such as salt, malt, milk solids, non-fat milk solids, whey, softeners, such as mono- and diglycerides, humectants, preservatives and, of course, a liquid, which may be milk, buttermilk, water and the like. All of these are well known to the art and will not be further discussed herein for the sake of conciseness.

The particular process for mixing and fermenting the dough is likewise any of the conventional processes, including the conventional straight dough method, the "sponge" dough method, the continuous and semi-continuous methods, all of which are well known in the art. Other ingredients may be added to the dough for these particular methods, including chemical blowing agents, emulsifiers, elastic producing agents and the like.

Similarly, various flavoring agents may be added to the dough, such as banana flavors, raisins, and other dried fruits, cracked cereal, flavor potentiators and enhancers, etc. Here again, all of these are well known in the art and will not be described herein.

The yeast of the present invention, as noted above, will not efficiently use the normal yeast growth source, i.e. sucrose. Thus, the yeasts are distinct from normal baker's yeast (*Saccharomyces cerevisiae*), and to this extent, the conventional dough formulations must be modified. Generally speaking, the yeast growth source is a sugar, not including sucrose. The yeast will grow well with one or more of dextrose, galactose and trehalose, as the yeast growth source, and one or more thereof should be included in the dough formulation, especially for the more highly leavened baked products, such as bread and the like. However, it has been discovered that dextrose is advantageously used as the major yeast growth source, and will provide leavening rates consistent with normal amounts of leavening. Thus, dextrose is the preferred form of the yeast growth source.

The present yeasts function in a manner considerably different from that of normal baker's yeast. With normal baker's yeast, as explained above, flavor and aroma production during fermentation are relatively low in comparison with the rate of leavening of the dough. Quite contrarily to baker's yeast, the present yeasts give relatively high amounts of flavor and aroma production, in comparison with the degree of leavening, during the fermentation and proofing periods. Accordingly, with the present yeasts, highly flavored dough can be prepared in relatively short times. The leavening of the dough during these relatively short times, however, may not be to the degree desired for highly leavened baked products. In this case, a preferred form of the invention is to include in the dough formulation normal baker's yeast. The coaction of the present yeasts and the baker's yeast will allow rapid flavor and aroma development while at the same time rapid leavening takes place. Thus, for highly leavened products, all of high levels of flavor, aroma and leavening may be achieved in a relatively short time, as compared to the same degrees of flavor, aroma and leavening achieved by baker's yeast. In this case, as will be appreciated, the baker's yeast will effectively grow with sucrose, as the yeast growth source and, accordingly, the dough composition may contain sucrose for the baker's yeast growth source. However, baker's yeast will effectively grow on other sugars, e.g. dextrose. In connection with the amount of growth source, this can vary widely, as is common to the baking industry, and usual proportions of yeast growth source are suitable for the present invention, both for the yeast growth source of the present yeasts as well as the yeast growth source for the *Saccharomyces cerevisiae*, if used. Indeed, dough normally contains sweetners, and the amount of sweetner, e.g. sucrose, will be considerably in excess of the amount required to function as the sweetner and as the baker's yeast growth source. However, generally speaking, the amount of yeast growth source should be from as little as 0.1%, based on the weight of the cereal, up to as much as 1.5%.

The ratio of the present flavor producing yeasts to the baker's yeast, when used, can vary widely, but generally speaking, weight ratios of 80:20 to 20:80 are desirable. More usually, these ratios will be between 75:25 and 50:50, with approximately 65:35 being the preferred embodiment.

The dough may be prepared in any of the conventional manners, as noted above, but particularly in the continuous and semi-continuous processes, it is often advantageous to supplement the leavening process by either mechanical leavening or chemical leavening. Thus, the leavening of the present dough may be in part by the yeasts and in part by mechanical or chemical leavening, or combinations thereof. Mechanical leavening, as is well known in the art, is achieved by whipping devices and the like, while chemical leavening is achieved by chemical blowing agents, such as sodium bicarbonate. Normally, however, mechanical leavening or chemical leavening will only be used in continuous or semi-continuous processes.

Irrespective of the particular process used, the dough is prepared by simply mixing, as is conventional in the art, the ingredients with or without a "sponge". Once the dough has reached its normal elasticity and leavening, it is baked at conventional temperatures, e.g. between 300° and 500° F., more usually around 400° F., all of which is well known to the art.

The dextrose or other suitable yeast growth source for the present yeasts may be added to the dough in relatively pure form or impure form. Thus, for example, the dextrose may be added as purified dextrose, corn syrup, corn syrup solids, and the like. For impure forms, however, the impurity thereof should be taken into account in adding the proper amount for yeast growth source purposes. Likewise, the present yeasts may be added to the dough composition in a variety of forms, e.g. active dry yeasts, or compressed form, and the like. The amount of yeast will, primarily, govern the rapidity of development of flavor, aroma and leavening, and generally speaking, the yeast should be at least 0.1%, based on the weight of the cereal, and more preferably, at least 0.5%. Higher levels of yeast may be used, e.g. up to 5% or more, although little additional aroma, flavor and leavening will result therefrom. The foregoing percentages refer to the total amount of yeast, but when mixtures of the present yeasts and *Saccharomyces cerevisiae* are used, the proportions should be in the range stated above. Proportions between *Candida lusitaniae* and *Saccharomyces delbrueckii*, when combinations are used, can vary from use of only one to only use of the other, and all proportions thereinbetween.

While the foregoing discussion has been mainly in connection with bread, it will be appreciated that the present dough may take the form of a variety of doughs for baked goods, e.g. pasteries, buns, cookies, bisquits, rolls, popovers, pizza shells and the like. Thus, the foregoing disclosure and the following claims should be so construed.

The following examples will illustrate the invention, although it is to be understood that the invention is not limited to the examples, but extends to the breadth of the foregoing disclosure and the following claims. In the examples, as well as in the foregoing disclosure and following claims, all percentages and parts are by weight unless otherwise indicated.

EXAMPLE 1

The following Examples will compare the aroma and flavor development of baked products produced from doughs flavored and leavened with conventional baker's yeast, and baked products produced from doughs produced with the present yeasts. In the Examples, the dough is mixed, fermented and allowed to proof to a standard template volume. The dough is fermented for 2½ hours, divided into weighed loaf amounts, panned and allowed to proof until the template volume is reached. Thus, the Examples compare the ability of the present yeasts to produce flavor and aroma with that produced by conventional baker's yeast.

Straight dough batches were prepared by mixing 1000 g of wheat flour, 5 g of yeast food [ARKADY]* 46 g of dextrose, 40 g of hydrogenated vegetable oil shortening, 40 g of non-fat dry milk solids and 20 g of salt. Yeast in the amounts indicated below were added. To that mixture was added 640 g of ice water and mixing was performed in a Hobart bread mixer at number 1 speed for two minutes and at number 2 speed for 14 minutes. The mixed dough was fermented at 80° F. for 2 and ½ hours, scaled to 510 g pieces, allowed to rest for 15 minutes, molded and proofed in pans. After proofing to the standard template for "white pan bread", the loaves were baked at 400° F. for 25 minutes.

*Trademark

A control batch was prepared with 25 g of baker's yeast (60% moisture) and 2 test batches were prepared with 11.25 g of baker's yeast (60% moisture), and 20.6 g of test yeast (70% moisture). These amounts correspond to approximately 65% test yeast and 35% baker's yeast. In test 1, *Candida lusitaniae* was the test yeast and in test 2, *Saccharomyces delbrueckii* was the test yeast.

The control proofed to the template volume in 52 minutes; test 1 proofed to the template volume in 60 minutes; and test 3 proofed to the template volume in 70 minutes. However, in both test cases, the test yeasts batches, after baking, provided substantially more aroma and flavor than that provided by the control, as determined by an aroma and flavor panel (blind).

EXAMPLE 2

The procedure of Example 1 was repeated, except that the percentage of the test yeast was about 75% and the percentage of the baker's yeast was about 25% of the total 31.85 g of yeast.

The time for proofing to the template volume was 52 minutes for the control, 60 minutes for the *Candida lusitaniae* and 70 minutes for the *Saccharomyces delbrueckii*. In both cases, the test yeasts batches, after baking, provided substantially more aroma and flavor than that provided by the control.

EXAMPLE 3

The procedure of Example 1 was repeated, except that only *Saccharomyces delbrueckii* yeast was used in the test batch (31.85 g of yeast). The time for proofing to the template was 47 minutes for the control and 78 minutes for the test yeast. The baked batch of this test yeast provided substantially more aroma and flavor than that provided by the control, as determined by a panel (blind).

As can therefore be seen from the Examples, the present yeasts provide high levels of flavor and aroma in rapid leavening times. Thus, the objects of the invention have been achieved, and the invention extends to the spirit and scope of the annexed claims.

What is claimed is:

1. In a process for producing a leavened dough, comprising forming a dough of a cereal, shortening, leavening yeasts and a yeast growth source, fermenting the dough and leavening the dough, the improvement wherein the leavening yeasts are at least in part rapid flavor-producing yeasts which are a mixture of *Candida lusitaniae* and *Saccharomyces delbrueckii*.

2. The process of claim 1 wherein the yeast growth source is at least in part dextrose.

3. The process of claim 1 wherein *Saccharomyces cerevisiae* yeasts are also contained in the dough.

4. The process of claim 3 wherein the ratio of the rapid flavor-producing yeasts and the *Saccharomyces cerevisiae* is from 80:20 to 20:80.

5. The process of claim 1 wherein the leavening of the dough is in part by mechanical leavening or chemical leavening.

6. The process of claim 5 wherein the dough production is continuous or semi-continuous.

7. The process of claim 1 wherein the leavened dough is baked.

8. The process of claim 1 wherein the dough also contains sweetners.

9. The process of claim 8 wherein at least part of the sweetners is sucrose.

10. A fermented dough composition comprising a cereal, shortening, a yeast growth source and at least in part rapid flavor-producing yeasts which are mixtures of *Candida lusitaniae* and *Saccharomyces delbrueckii*.

11. The composition of claim 10 wherein the yeast growth source is at least in part dextrose.

12. The composition of claim 10 wherein *Saccharomyces cerevisiae* yeasts are also contained in the dough.

13. The composition of claim 10 wherein the ratio of the rapid flavor-producing yeasts and the *Saccharomyces cerevisiae* is from 80:20 to 20:80.

14. The composition of claim 10 wherein the leavened dough is baked.

15. The composition of claim 10 wherein the dough also contains sweetners.

16. The composition of claim 10 wherein at least part of the sweetners is sucrose.

* * * * *